United States Patent
Pefkianakis

(10) Patent No.: US 10,779,173 B2
(45) Date of Patent: Sep. 15, 2020

(54) PEAK DATA TRANSFER RATES

(71) Applicant: Hewlett Packard Enterprise Development LP, Houston, TX (US)

(72) Inventor: Ioannis Pefkianakis, Palo Alto, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 15/884,116

(22) Filed: Jan. 30, 2018

(65) Prior Publication Data
US 2019/0239104 A1 Aug. 1, 2019

(51) Int. Cl.
| | |
|---|---|
| *H04W 24/08* | (2009.01) |
| *H04L 1/00* | (2006.01) |
| *H04L 5/00* | (2006.01) |
| *H04L 12/26* | (2006.01) |
| *H04W 28/02* | (2009.01) |
| *H04B 7/06* | (2006.01) |
| *H04W 84/12* | (2009.01) |

(52) U.S. Cl.
CPC ........... *H04W 24/08* (2013.01); *H04L 1/0002* (2013.01); *H04L 1/0015* (2013.01); *H04L 5/006* (2013.01); *H04L 5/0091* (2013.01); *H04L 43/0823* (2013.01); *H04L 43/0888* (2013.01); *H04W 28/0252* (2013.01); *H04B 7/0632* (2013.01); *H04L 1/0026* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 7,583,637 B2 | 9/2009 | Lau et al. | |
| 9,258,070 B2 | 2/2016 | Wang et al. | |
| 9,271,192 B1 | 2/2016 | Sampath et al. | |
| 9,509,439 B2 | 11/2016 | Cho et al. | |
| 2003/0078065 A1 | 4/2003 | Hoagland et al. | |
| 2006/0159120 A1* | 7/2006 | Kim | H04B 7/0417 370/465 |
| 2007/0081462 A1 | 4/2007 | Gefflaut et al. | |

(Continued)

OTHER PUBLICATIONS

Dr. Ramana; "Rate Adaption Algorithms in 802.11 Networks"; printed Mar. 13, 2017.

(Continued)

*Primary Examiner* — James P Duffy
(74) *Attorney, Agent, or Firm* — Hewlett Packard Enterprise Patent Department

(57) ABSTRACT

Examples described herein include receiving an indicator of the quality of a wireless signal between an access device and a computing device, determining an upper data transfer rate from the indicator, and determining a range of data transfer rates. The range may include the upper data transfer rate and a second data transfer rate. Examples disclosed herein also include evaluating a throughput at the upper data transfer rate based on an error rate at the upper data transfer rate and evaluating a throughput at the second data rate based on an error rate at the second data transfer rate. Examples disclosed herein also include determining a peak data transfer rate within the range of data transfer rates based on the throughputs.

22 Claims, 4 Drawing Sheets

(56) References Cited

U.S. PATENT DOCUMENTS

| | | | | |
|---|---|---|---|---|
| 2007/0111666 | A1* | 5/2007 | Waxman | H04B 7/0634 |
| | | | | 455/67.7 |
| 2011/0213877 | A1* | 9/2011 | Plummer | H04W 36/06 |
| | | | | 709/224 |
| 2014/0071955 | A1 | 3/2014 | Du et al. | |
| 2014/0254649 | A1 | 9/2014 | Afkhami et al. | |

OTHER PUBLICATIONS

Halperin, D., et al.; "Predictable 802.11 Packet Delivery from Wireless Channel Measurements", 2010; 14 pages.
Huang, T. et al.; "EasiRA: A Hybrid Rate Adaptation Scheme for 802.11 Mobile Wireless Access Networks"; 2012; 6 pages.
IEEE Standards Standards Association. IEEE Standards 802.11ac-2013: Enhancements for Very High Throughput for Operation in Bands below 6 GHz, 2013.
Kriara, L., et al., "SampleLite: A Hybrid Approach to 802.11n Link Adaptation"; 2015; 9 pages.
Lou, H., et al.; "A Comparison of Implicit and Explicit Channel Feedback Methods for MU-MIMO WLAN Systems," In IEEE PIMRC, 2013.; 3 pages.
Pefkianakis, I., et al.; MIMO Rate Adaptation in 802.11n Wireless Networks. In ACM MobiCom, 2010; 12 pages.
Qiao, D. et al.; "MiSer: An Optimal Low-energy Transmission Strategy for IEEE 802.11a/h"; Sep. 14-19, 2003; 15 pages.
Wang, P., et. al.; On Maximum Eigenmode Beamforming and Multi-User Gain. In IEEE Transactions on Information Theory, vol. 57, 2011.; 17 pages.
Wong, Starsky, H.Y, et al.; "Robust Rate Adaptation for 802.11 Wireless Networks" In ACM MobiCom, 2006; 12 pages.
European Search Report and Search Opinion Received for EP Application No. 19154344.6, dated Jul. 1, 2019, 10 pages.

* cited by examiner

PEAK DATA TRANSFER RATES

BACKGROUND

The quality of a wireless signal between two computing devices may change during the course of communication. The change in wireless signal may result in a change in the data transfer rate (e.g., PHY rate) between the computing devices.

BRIEF DESCRIPTION OF THE DRAWINGS

The following detailed description references the drawings, wherein.

DETAILED DESCRIPTION

Figure 1:
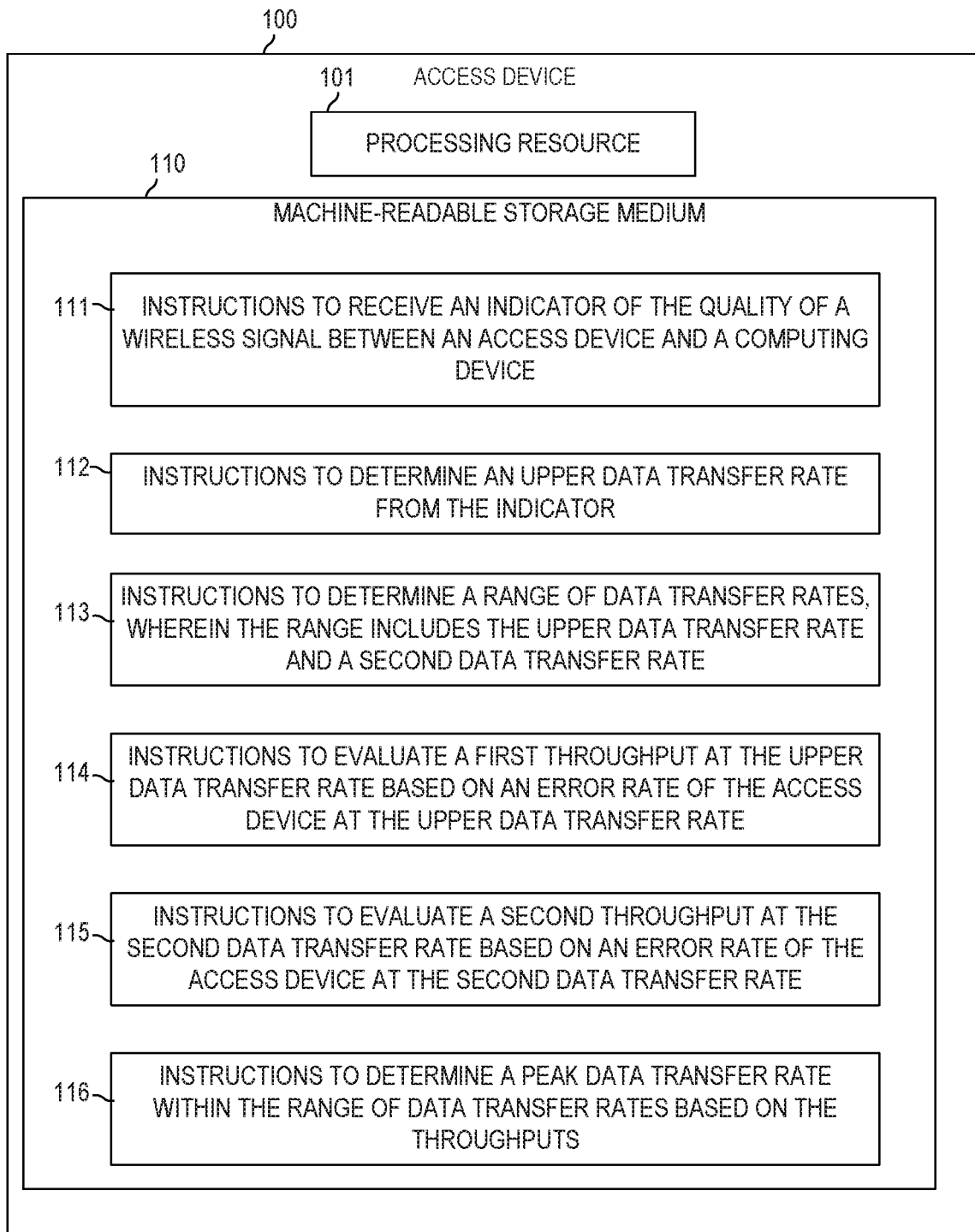
FIG. 1 is a block diagram of an access device with instructions to determine a peak data transfer rate for a wireless connection, according to some examples.

An access device may propagate a wireless signal for computing devices that are in range to connect to the wireless signal. Accordingly, an access device may build a network of connected devices and may allow computing devices to connect to a wired connection wirelessly.

An access device may be physically configuration to support a maximum data transfer rate. However, the actual data transfer rate between an access device and a connected computing device may be different from the maximum data transfer rate supported by the access device. This is due to several factors, including but not limited to distance between the computing device and the access device, interference from other wireless signals in the environment, constant movement of the computing device, obstacles that block the signal, interference from other computing devices connected to the access device, etc. The data transfer rate may also be affected by limitations of the connected computing device (e.g., a computing device that cannot handle rates faster than a certain rate, etc.)

Accordingly, the actual data transfer rate between an access device and a computing device may be slower than the maximum data transfer rate supported by the access device. Additionally, the actual data transfer rate between an access device and a computing device may be varied dynamically when environmental factors cause the wireless signal quality to degrade. For example, a fast data transfer rate may be slowed to account for a degraded signal quality. This is because using a fast rate in a low quality wireless environment may result in the loss of data.

Access devices may employ a variety of tools to measure the quality of the wireless environment. One of these tools is a signal-to-noise ratio (SNR). In some situations, an SNR may be relied on to determine an actual data transfer rate between an access device and a computing device. The sole use of an SNR to determine an actual data transfer rate, however, fails to account for the capability of the computing device to receive data at a certain rate. The use of an SNR may also fail to account for interference between computing devices that are using beamforming technologies (e.g., MU-MIMO (Multiple-User, Multiple-Input and Multiple-Output), SU-MIMO (Single-User, Multiple-Input and Multiple-Output), etc.). Another tool that is used to determine connection quality is a packet error rate (PER). The sole use of a PER to determine an actual data transfer rate fails to, however, account for dynamic mobility scenarios and hidden terminal scenarios. For example, to get a PER, the access device may have to send numerous packets to the computing device. A computing device that is constantly changing locations in relation to the access device (e.g., a mobile phone) may not be able to receive the packets for the PER calculation. Accordingly, the PER may not be reflective of the current environment of the wireless connection. Thus, these methods result in inefficient PHY adaptations that may result in less than optimal data transfer rates.

Examples disclosed herein address these technological difficulties by first relying on a quality indicator to determine a range of data transfer rates at which to evaluate and then using an error rate to evaluate the rates within the range. In some examples, a signal to noise ratio is calculated based on an indicator of signal quality received by the access device. Based on the SNR, an upper data transfer rate is determined. The upper data transfer range is then used as a guide to determine a range of data transfer rates to be evaluated. The range includes the upper data transfer rate. A throughput for each rate in the range is calculated based on an error rate of each rate in the range. The rate with the highest (i.e. fastest) throughput is determined to be the peak data transfer rate. In some examples, the SNR calculated may account for intra-device interference by computing devices in beamforming groups. Accordingly, examples disclosed herein allow for quick adaptation of a data transfer rate in ever-increasing dynamic environmental conditions. Examples disclosed herein also account for effect of intra-device interference in the rate adaptation.

In some examples, a computing device is provided with a non-transitory machine-readable storage medium comprising instructions, that, when executed, cause a processing resource to receive an indicator of the quality of a wireless signal between an access device and a computing device. The instructions, when executed, also cause the processing resource to determine an upper data transfer rate from the indicator, determine a range of data transfer rates, wherein the range includes the upper data transfer rate and a second data transfer rate, evaluate a first throughput at the upper data transfer rate based on an error rate of the access device at the upper data transfer rate, evaluate a second throughput at the second data transfer rate based on an error rate of the access device at the second data transfer rate, and determine a peak data transfer rate within the range of data transfer rates based on the throughputs.

In some examples, an access device comprises a threshold engine, an error engine, and a rate engine. The threshold engine is to receive an indicator of the quality of a wireless signal between the access device and a computing device, determine an upper data transfer rate from the indicator, and determine a range of data transfer rates. The range includes the upper data transfer rate. The error engine is to determine an error rate for each rate in the range of data transfer rates. The rate engine is to evaluate a throughput for each rate in the range of data transfer rates based on the error rate for each rate in the range of data transfer rates. The rate engine is also to determine a peak data transfer rate within the range based on the throughputs.

In some examples, a method comprises receiving an indicator of the quality of a wireless signal between the access device and a computing device, determining a signal to noise ratio based on the indicator, determining an upper data transfer rate based on the signal to noise ratio, and determining a range of data transfer rates that comprises the upper data transfer rate and a second data transfer rate. The method also comprises evaluating a first throughput based on an error rate of the access device at the upper data transfer rate, evaluating a second throughput based on an error rate of the access device at the second data transfer rate, and determining a peak data transfer rate within the range of data transfer rates based on the first throughput and the second throughput. The method is performed by a processing resource of an access device.

Referring now to the figures, FIG. 1 is a block diagram of an access device 100 with instructions to determine a peak data transfer rate for a wireless connection. In some examples, the wireless connection is between access device 100 and a computing device (not shown). As used herein, a "computing device" may be a server, a networking device, chip set, desktop computer, workstation, a mobile phone, or any other processing device or equipment. As used herein, an "access device" may be a computing device that allows another computing device to connect and/or form a wireless network (e.g., a wireless local area network (WLAN), wireless personal area network (WPAN), etc.). The protocols used by the access device may differ depending on the type of wireless connection. For example, in a Wi-Fi connection, the access device may be referred to as a wireless access point (VVAP) and use a format set by IEEE (e.g. 802.11n, 802.11ac, etc.). In these examples, the access device may serve to connect a computing device to a wired network using a Wi-Fi wireless signal. In these examples, the access device may also serve to form wireless networks. In another example, in Bluetooth connection, the access device may use the Bluetooth format set by SIG. The access device may be a master Bluetooth device that connects wirelessly to other computing devices (e.g., slave devices), setting up a WPAN. In some examples, the access device may also translate a wired network into a Bluetooth wireless signal, allowing at least one computing device to communicate to the wired network wirelessly via Bluetooth. Other wireless connections may also be used. As used herein a data transfer rate may include the speed at which data is sent over the wireless connection (i.e. PHY rate).

In FIG. 1, the wireless signal being evaluated exists between access device 100 and a computing device. Thus, access device 100 is the device that generates the wireless signal and determines the peak data transfer rate. However, in other example and not shown in FIG. 1, the wireless signal being evaluated may exist between an access device not shown in FIG. 1 and a computing device. Accordingly, in those examples, the computing device that determines the peak data transfer rate is a different computing device than the computing device (i.e. access device) that generates the wireless signal. In some examples, the computing device that wirelessly connects to the access device may be a portable device such as mobile phone, a laptop, a desktop, an electronic reader, a tablet, etc. that may wirelessly connect to a network.

Access device 100 includes a processing resource 101 and a machine-readable storage medium 110. Machine readable storage medium 110 may be in the form of non-transitory machine-readable storage medium, such as suitable electronic, magnetic, optical, or other physical storage apparatus to contain or store information such as instructions 111, 112, 113, 114, 115, 116, related data, and the like.

As used herein, "machine-readable storage medium" may include a storage drive (e.g., a hard drive), flash memory, Random Access Memory (RAM), any type of storage disc (e.g., a Compact Disc Read Only Memory (CD-ROM), any other type of compact disc, a DVD, etc.) and the like, or a combination thereof. In some examples, a storage medium may correspond to memory including a main memory, such as a Random Access Memory, where software may reside during runtime, and a secondary memory. The secondary memory can, for example, include a non-volatile memory where a copy of software or other data is stored.

In the example of FIG. 1, instructions 111, 112, 113, 114, 115, and 116 are stored (encoded) on storage medium 110 and are executable by processing resource 101 to implement functionalities described herein in relation to FIG. 1. In some examples, storage medium 110 may include additional instructions, like, for example, the instructions to implement some of the functionalities described in relation to access device 200 in FIG. 2 or Wi-Fi access point 400 in FIG. 4. In other examples, the functionalities of any of the instructions of storage medium 110 may be implemented in the form of electronic circuitry, in the form of executable instructions encoded on machine-readable storage medium, or a combination thereof.

Processing resource 101 may, for example, be in the form of a central processing unit (CPU), a semiconductor-based microprocessor, a digital signal processor (DSP) such as a digital image processing unit, other hardware devices or processing elements suitable to retrieve and execute instructions stored in a storage medium, or suitable combinations thereof. The processing resource can, for example, include single or multiple cores on a chip, multiple cores across multiple chips, multiple cores across multiple devices, or suitable combinations thereof. The processing resource can be functional to fetch, decode, and execute instructions 111, 112, 113, 114, 115, and 116, as described herein.

Instructions 111 may be executable by processing resource 101 to receive an indicator of the quality of the wireless signal. In some examples, the indicator may include a variable (e.g., at least one alphanumeric character, at least one numerical value, etc.) that may be used to correlate to the quality of the wireless signal.

In some examples, the indicator may include a feedback message from the computing device. The feedback message may be generated by the computing device from an analysis of an initial signal sent to the computing device from the access device. For example, with WLAN wireless connections using the IEEE 802.11ac format, the access device may send a packet to the computing device called a sounding packet. The packet includes fields (e.g., OFDM training fields) that are analyzed by the computing device to determine a feedback message. The feedback message may include a feedback matrix which indicates how well the wireless signal performs via a certain path with regard to that particular computing device. In the IEEE 802.11ac format, this feedback matrix is called a VHT Compressed Beamforming Feedback (CBF) and may be the indicator of the wireless signal quality received by instructions 111.

However, other protocol appropriate indicators may be used. For example, in other examples, the quality indicator may include a received signal strength indicator (RSSI). An RSSI is a measure of how strong the signal is at the computing device (i.e. the device receiving the signal propagated by access device). In some examples, the RSSI is measured in decibels (db). The quality indicator may also include a floor noise level indicator. This indicator may correlate to the level of noise that is in the environment and is also measured in db. Accordingly, the noise level indicator may allow the sensing of interference from other types of wireless signals in the environment.

In yet other examples, the indicator that is received may be a signal to noise ratio (SNR). The SNR may be calculated by the computing device and then sent to the access device 100. As a non-limiting example of this, in IEEE 802.11ac, the computing device may provide to the access device an MU Exclusive Beamforming report, which carries an average SNR applicable to all subcarriers.

Instructions 112 may be executable by processing resource 101 to determine an upper data transfer rate from the indicator. As used herein, the upper data transfer rate is the fastest rate at which data should be transferred between access device 100 and the computing device over the wireless signal, given the quality of the wireless signal. The upper data transfer rate may or may not coincide with the fastest possible rate at which data can be transferred, given the physical limitations of the access device and the computing device. Thus, in some examples, the fastest possible rate is 50 db and the upper data transfer rate is also 50 db. However, in other examples, the fastest possible rate is 50 db and the upper data transfer rate is 40 db.

The upper data transfer rate may be determined using the indicator. For example, in situations where the indicator is an SNR, the upper data transfer rate may be determined using SNR to data transfer rate mappings. These mappings correlate SNR values to the rates at which data transfer should be successful. In some examples, these mappings may be set and provided by the wireless technology standard. Accordingly, given an SNR, an upper data transfer rate may be determined via these mappings. In situations where the indicator includes an RSSI, the SNR may be calculated, for example, by adding the noise floor value to the RSSI. For example, an RSSI of −55 db and a noise floor value of −95 db would result in an SNR value of 40 db. The upper rate may be determined using SNR to data transfer rate mappings.

In some examples, the wireless connection may include beamforming to allow concurrent downlink data streams from an access device to computing devices (e.g., Multiple Users, Multiple-Input and Multiple-Output mode (MU-MIMO), Single User, Multiple-Input and Multiple-Output (SU-MIMO), etc.). In these examples, at least one device is connected to the access device in a MIMO group. The access device may direct its signal in a specific direction with relation to a specific device to efficiently send the signal to that specific device in the MIMO group. Accordingly, the computing devices in a MIMO group may cause interference with one another's signals.

In these situations, the quality indicator received may be used to calculate an SNR that captures the intra-device interference. For example, with IEEE 802.11ac, the values in the feedback matrix may be used in the following equation:

$$\frac{1/K}{\left(1/\frac{\|D_k\|^2}{N}\right) + \frac{1}{K}\Sigma_{j\neq k}\|V_k^H V_j\|^2} \quad \text{(Eq. 1)}$$

where N is equal to the noise factor as sensed by the access device, and H, V, and D may be determined through the feedback matrix sent by the computing device to the access device. H, V, D, and N are described by the 802.11ac standard. K represents the total number of computing devices in the MIMO group and j is the counter of the total number of computing devices.

Accordingly, if there are 5 computing devices in the MIMO, K is equal to five and j is iterated from 1 to 4. With IEEE 802.11ac, this SNR accounts for the interference caused by the computing groups in the MIMO and accurately determines an SNR in view of that interference. This SNR may be referred to as an SINR. From the SINR, the upper data transfer rate may be determined via SI NR to transfer rate mappings.

Instructions 113 may be executable by processing resource 101 to determine a range of data transfer values. The range may have two endpoints, one endpoint being the lowest (i.e. slowest) rate in the range and the other endpoint being the highest (i.e. fastest) rate in the range. In some examples, the lowest endpoint may be the slowest rate that access device 100 can support. Formats for wireless connections (such as Wi-Fi) set "speed levels" that format-compatible devices follow. These "speed levels" may increase (or decrease) in an uneven stepwise function. For example, the slowest rate supported by an access device implementing WiFi may be 12 Mbps. The next faster "speed" level as set by the format is not 12.1 Mbps or 13 Mbps, but is rather 18 Mbps. The second faster speed after that is not 19 Mbps, but may be 24 Mbps. Accordingly, in some examples, the lowest endpoint may be a "speed level" faster than the slowest rate, two "speed levels" faster than the slowest rate, or etc. that access device 100 can support.

The range includes the upper data transfer rate, as determined by instructions 112, and a second data transfer rate. A second data rate, as used herein, means a rate that is different from the upper data transfer rate. In some examples, the second data rate is lower (i.e. slower) than the upper data transfer rate. Thus, accordingly, in some examples, the lowest endpoint of the range may be characterized as the second data transfer rate. However, in other examples, the second data transfer rate is higher (i.e. faster) than the upper data transfer rate. In some examples, the highest endpoint of the range is the upper data transfer rate. In other examples, the highest endpoint of the range is one "speed level" faster than the upper data transfer rate, two "speed levels" faster than the upper data transfer rate, etc. Thus, in some examples, the highest endpoint of the range may be characterized as the second data transfer rate.

A non-limiting example of the range include: [lowest rate supported by access device, upper data transfer rate], where the second data transfer rate is in between the two endpoints. Another non-limiting example may be [second data transfer rate, upper data transfer rate]. Yet another non-limiting example may be [lowest rate supported by access device, second data transfer rate], where the upper data transfer rate is in between the two endpoints.

In some examples, there may be a number of rates between the two endpoints of the range. For example, there can be three rates in the range: the lowest endpoint, the highest endpoint, and a rate between the lowest endpoint and the highest endpoint. In other examples, the range includes the two endpoints and no other rates between the range. In these examples, the two endpoints are "speed levels" that are right next to each other.

Instructions 114 may be executable by processing resource 101 to evaluate a throughput at the upper data transfer rate. The evaluation may be based on an error rate of the access device at the upper data transfer rate. In some examples, the error rate measures the amount of data received by computing device out of the amount of data sent by access device 100. A non-limiting example of an error rate is a packet error rate (PER).

In some examples, instructions 114 may also include instructions to determine an error rate at the upper data transfer rate. In some situations, the error rate may be determined by sending out a small set of data to the computing device and measuring how much of that data is received by the computing device. Thus, if access device 100 sends 10 packets at the upper data transfer rate to the computing device and the computing device receives 8 packets, then the error rate (e.g. PER) is 0.2 for the upper data transfer rate. In other situations, instead of sending out the data to calculate the error rate, access device 100 may query an error rate database. The error rate database may store statistics of error rates based on historical data. The database may be physically stored on access device 100 or may be stored on a different computing device that is accessible to access device 100.

Once the error rate is determined, processing resource 101 may evaluate the throughput at the upper data transfer rate by subtracting the error rate from 1 and multiplying the difference by the upper data transfer rate. The resulting product is the throughput at the upper data transfer rate.

In some examples, there may be protocol overheads associated with operating the specific wireless technology. This may cause the transfer rate to slow down. Accordingly, the protocol overhead may lower the upper data transfer rate. For example, the upper data transfer rate may be 100 Mbps but protocol overheads may cause a 10 Mbps decrease. Accordingly, the effective upper data transfer rate is 90 Mbps. In these examples, the throughput is determined using the effective upper data transfer rate instead of the upper data transfer rate. The throughput at the upper data transfer rate may be characterized as a "first" throughput.

Instructions 115 may be executable by processing resource 101 to evaluate a throughput at the second data transfer rate. This throughput, as compared to the throughput at the upper data transfer rate, may be characterized as a "second" throughput. The evaluation may be based on an error rate of the access device at the second data transfer rate.

In some examples, instructions 115 may also include instructions to determine an error rate at the second data transfer rate. In some situations, the error rate may be determined by sending out a small set of data to the computing device at the second data transfer rate and measuring how much of that data is received by the computing device. In other situations, instead of sending out the data to calculate the error rate, access device 100 may query an error rate database.

Once the error rate is determined, processing resource 101 may evaluate the throughput at the second data transfer rate by subtracting the error rate from 1 and multiplying the difference by the second data transfer rate. The resulting product is the throughput at the second data transfer rate. In examples with protocol overhead the protocol overhead may lower the second data transfer rate. In these examples, the throughput is determined using the effective second data transfer rate instead of the second data transfer rate.

Instructions 116 may be executable by processing resource 101 to determine a peak data transfer rate within the range of data transfer rates based on the throughputs evaluated via instructions 114 and 115. The first and second throughputs may be compared and the highest (i.e. fastest) throughput may be chosen as the peak data transfer rate. Instructions 116 may also include instructions to implement the peak data transfer rate.

As discussed above, in some examples, the range of data transfer rates may include other rates besides the upper data transfer rate and the second data transfer rate. Accordingly, in these examples, machine-readable storage medium 110 may include instructions to evaluate the throughput at these other data transfer rates in a similar manner as described above in relation to instructions 114 and 115. Thus, in these examples, the throughputs at these rates may be compared along with the first and second throughputs and the highest throughput may be chosen as the peak data transfer rate.

In some examples, instructions 111 may also include instructions to receive an updated indicator of the quality of the wireless signal. The updated indicator may be received periodically (i.e. according to a fixed schedule), received at any time where there is a change in environment of the wireless signal, received via command by a user of access device 100, etc. Accordingly, instructions 112 may include instructions to determine an updated upper data transfer rate from the updated indicator. Based on the updated upper data transfer rate, instructions 113 may include instructions to determine an updated range of data transfer rates that includes the updated upper data transfer rate and an updated second data transfer rate. In some examples, the updated second data transfer rate may be the same rate as the previous second data transfer rate. Instructions 114-116 may accordingly evaluate new updated throughputs based on the updated range and determine an updated peak data transfer rate based on the updated throughputs.

In some examples, the error rates of the access device at specific data transfer rates may be updated. The error rates may be updated periodically (i.e. according to a fixed schedule), updated at any time where there is a change in environment of the wireless signal, updated via command by a user of access device 100, etc. Accordingly, instructions stored on machine-readable storage medium 110 may include instructions to evaluate updated throughputs based on updated error rates. For example, instructions 114 may include instructions to evaluate an updated first throughput at the upper data transfer rate based on an updated error rate of the access device at the upper data transfer rate. Similarly, instructions 115 may include instructions to evaluate an updated second throughput at the second data transfer rate based on an updated error rate of the access device at the second data transfer rate. Instructions 116 may determine an updated peak data transfer rate based on the updated throughputs.

In some examples, the indicator (and thus the range) may be updated at the same time the error rates are updated. However, in other examples, the indicator and the error rates are updated independently of each other. Accordingly, in these examples, the range may be updated without updating of the error rates and the error rates may be updated without updating of the range.

Figure 2:
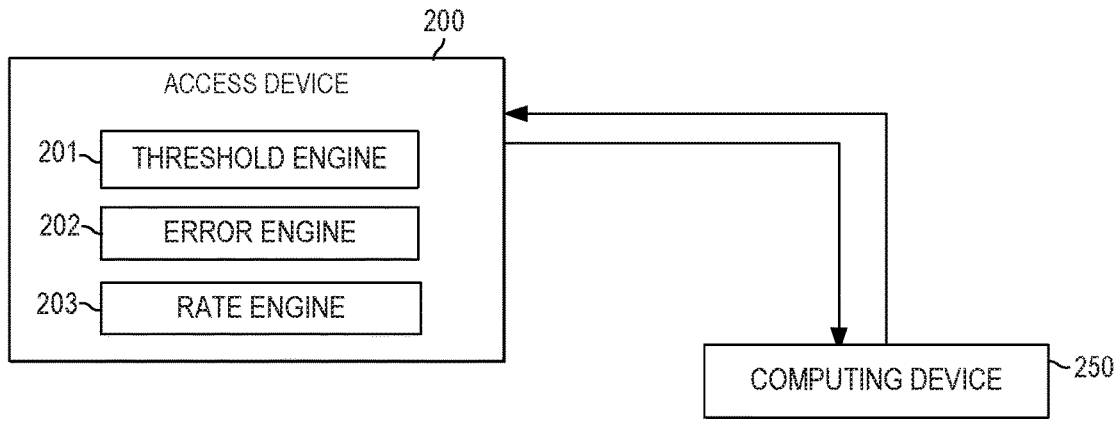
FIG. 2 is a block diagram of an access device to determine a peak data transfer rate for a wireless connection with a computing device, according to some examples.
Figure 4:
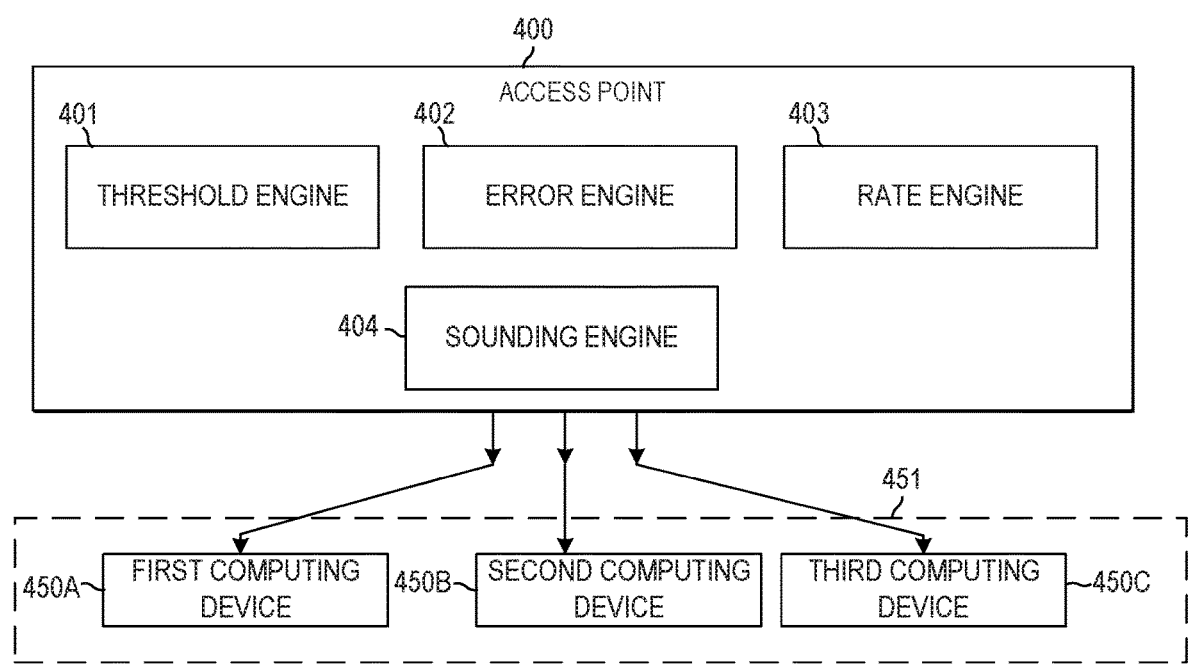
FIG. 4 is a block diagram of an access point to determine a peak data transfer rate for a computing devices in a MU-MIMO (Multiple-User, Multiple-Input and Multiple Output) group.

Access device 100 of FIG. 1, which is described in terms of processors and machine-readable storage mediums, can include one or more structural or functional aspects of access device 200 of FIG. 2, or WLAN access point 400 of FIG. 4, which are described in terms of functional engines containing hardware and software.

FIG. 2 illustrates a block diagram of an access device 200. In some examples, access device 200 may connect to a wired router/switch/hub via an Ethernet cable and project a wireless signal to a designated area, creating a wireless local area network (WLAN). In other examples, access device 200 may connect to a wired router/switch/hub and project a Bluetooth signal to a designated area. Computing device 250 may connect to access device 200 via the wireless signal propagated by access device 200.

Access device 200 comprises a threshold engine 201, an error engine 202, and a rate engine 203. Each of these aspects of access device 200 will be described below. Other engines can be added to access device 200 for additional or alternative functionality.

Each of engines 201, 202, 203, and any other engines, may be any combination of hardware (e.g., a processor such as an integrated circuit or other circuitry) and software (e.g., machine or processor-executable instructions, commands, or code such as firmware, programming, or object code) to implement the functionalities of the respective engine. Such combinations of hardware and programming may be implemented in a number of different ways. A combination of hardware and software can include hardware (i.e., a hardware element with no software elements), software hosted at hardware (e.g., software that is stored at a memory and executed or interpreted at a processor), or hardware and software hosted at hardware. Additionally, as used herein, the singular forms "a," "an," and "the" include plural referents unless the context clearly dictates otherwise. Thus, for example, the term "engine" is intended to mean at least one engine or a combination of engines. In some examples, access device 200 may include additional engines.

Each engine of access device 200 can include at least one machine-readable storage mediums (for example, more than one) and at least one computer processor (for example, more than one). For example, software that provides the functionality of engines on access device 200 can be stored on a memory of a computer to be executed by a processor of the computer.

Threshold engine 201 is an engine of access device 200 that includes a combination of hardware and software that allows access device to receive an indicator of the quality of a wireless signal between the access device 200 and computing device 250. As discussed above, an indicator of quality may include SNR, a feedback packet, an RSSI, etc. Threshold engine 201 may implement the functionalities as described in relation to instructions 111, 112, and 113. Accordingly, threshold engine 201 may allow access device to determine an upper data transfer rate from the indicator and determine a range of data transfer rates. The range includes the upper data transfer rate. The range may also include a number of other data transfer rates.

Error engine 202 is an engine of access device 200 that includes a combination of hardware and software that allows access device 200 to determine an error rate for each rate in the range of data transfer rates. For example, a range may have 10 total rates in the range. This number includes the upper data transfer rate, a lowest endpoint, a highest endpoint, and 7 other rates that are captured in the range. Error engine 202 determines 10 error rates, one for each rate in the range.

In some examples, to determine error rates, error engine 202 may allow access device 200 to send a set amount of data at each rate in the range. Error engine 202 may also allow access device 200 to determine how much of the data sent at each rate in the range was received by computing device 250. For example, 20 Mbps may be a rate that is captured in the range. Error engine 202 may send 10 packets to computing device 250 at 20 Mbps. Error engine 202 may receive a signal from computing device 250 that at the rate of 20 Mbps, computing device 250 received 5 packets out of the 10 packets sent. Error engine 202 may then calculate the error rate of the data transfer rate of 20 Mpbs as 5/10 or 0.5.

In other examples, error engine 201 may not determine the error rate dynamically by sending fresh data, but may rely on a historical database of error rates. The error rate database may be specific to the wireless connection between access device 200 and computing device 250. In other words, the database may include entries error rates determined from previous connections between access device 200 and computing device 250 using the same type of wireless protocol. The error rate database may be stored on a memory in access device 200 or may be stored on a different computing device but accessible to access device 200. Access device 200 may query the error rate database for the specific rates included in the range.

Rate engine 203 is an engine of access device 200 that includes a combination of hardware and software that allows access device 200 to evaluate a throughput for each rate in the range of data transfer rates based on the error rate for each rate in the range of data transfer rates. Thus, in the previous example of the rate of 20 Mbps and error rate of 0.5, rate engine 203 may determine that the throughput for the 20 Mpbs rate is 10 Mpbs. This is done by subtracting the error rate 0.5 from 1 and then multiplying the difference by 20 Mpbs. As discussed above in relation to instructions 116, the difference may also be multiplied by the effective rate instead of the rate, to take into account protocol overheads.

Rate engine 203 allows access device 200 to determine a throughput for each rate in the range. Rate engine 203 also allows access device 200 to determine a peak data transfer rate within the range based on the throughputs. This may be accomplished by comparing the throughputs and choosing the highest throughput as the peak data transfer rate.

Access device 200 of FIG. 2, which is described in terms of functional engines containing hardware and software, can include one or more structural or functional aspects of access point 400 of FIG. 4, or access device 100 of FIG. 1, which is described in terms of processors and machine-readable storage mediums.

Figure 3:
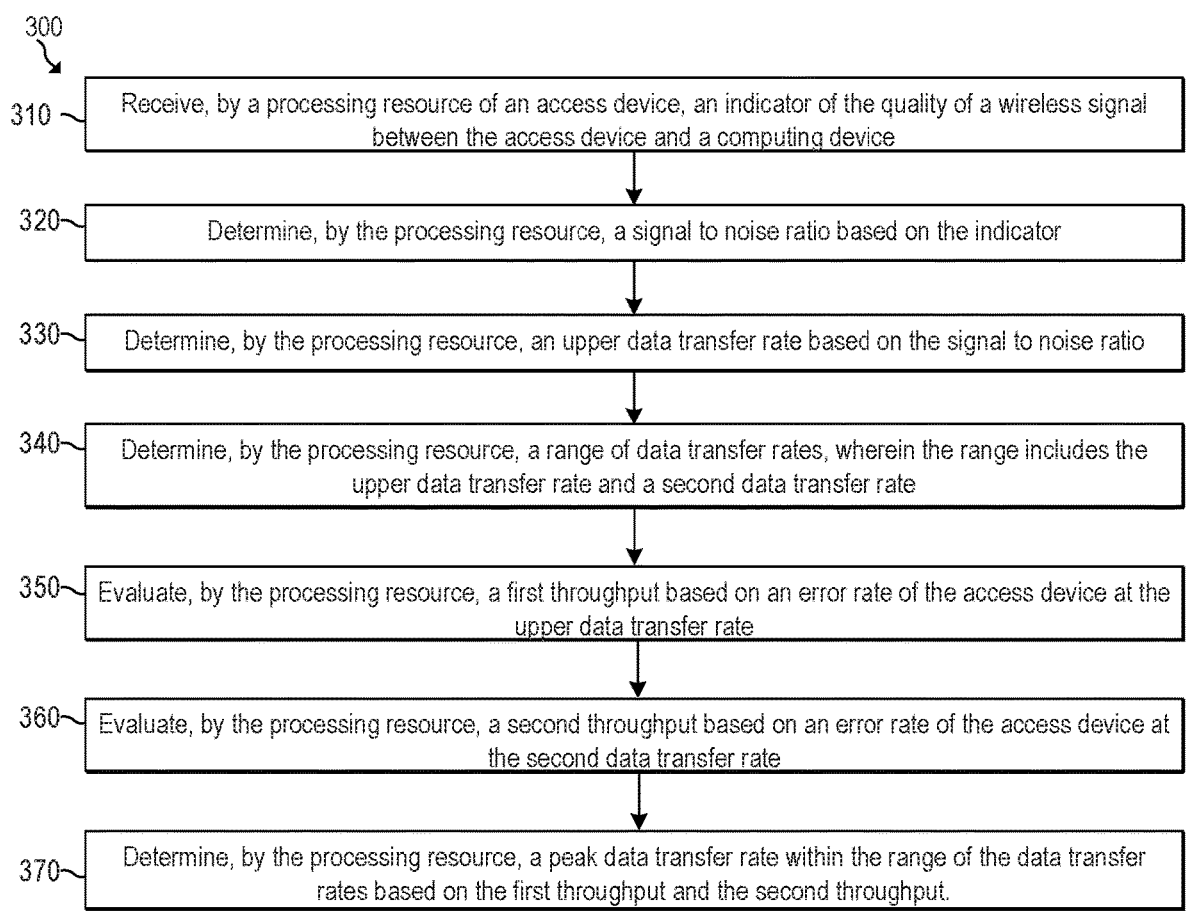
FIG. 3 is a flowchart of a method of determining a peak data transfer rate for a wireless connection, according to some examples.

FIG. 3 illustrates a flowchart for a method 300 to determine a peak data transfer rate for a wireless connection between an access device and a computing device. Although execution of method 300 is described below with reference to access device 100 of FIG. 1, other suitable devices for execution of method 300 can be utilized (e.g., access device 200 of FIG. 2 or access point 400 of FIG. 4). Additionally, implementation of method 300 is not limited to such examples and can be used for any suitable devices or system described herein or otherwise.

At 310 of method 300, processing resource 101 executes instructions 111 to receive an indicator of the quality of a wireless signal between the access device 100 and a computing device. As discussed above, the indicator of quality may depend on what type of wireless connection is between the access device 100 and the computing device. In some examples using WiFi, the indicator may be a feedback packet that is derived from a sounding packet sent by the access device (e.g., VHT Compressed Beamforming Feedback (CBF), etc.). In examples using Bluetooth, the indicator may be an RSSI.

At 320 and 330 of method 300, processing resource 101 executes instructions 112 to determine a signal to noise ratio (SNR) based on the indicator and to determine an upper data transfer rate from the SNR. As discussed above, in some examples the indicator may be an RSSI. Accordingly, the signal-to-noise ratio may be calculated from the RSSI using a floor noise value. Accordingly, the access device 100 may have hardware (e.g., sensors, etc.) that is able to read this floor noise value. In other examples, the indicator may be a feedback packet from the computing device. In these examples, the signal to noise ratio may be calculated from the values in the feedback packet. In examples where the computing device is in a MIMO group, the SNR calculated in a manner similar to that shown in equation 1, as shown above, may capture the intra-device interference among computing devices in the MIMO group. An SNR that captures the number of devices may be specifically be characterized as an SINR. The upper data transfer rate may be determined with tables or mappings that correlate data transfer rates and SNR (or SINR).

At 340 of method 300, processing resource 101 executes instructions 113 to determine a range of data transfer rates that includes the upper data transfer rate and a second data transfer rate. As discussed above, the range may include a number of other rates, including a lowest endpoint and a highest endpoint.

At 350 of method 300, instructions 114 are executed by processing resource 101 to evaluate a first throughput based on an error rate of the access device 100 at the upper data transfer rate. The first throughput is the rate at which data will actually be transferred at the upper data transfer rate, given the error rate at the upper data transfer rate.

At 360 of method 300, instructions 115 are executed by processing resource 101 to evaluate a second throughput based on an error rate of the access device at the second data transfer rate. The second throughput is the rate at which data will actually be transferred at the second data transfer rate, given the error rate at the second data transfer rate.

At 370 of method 300, processing resource 101 executes instructions 116 to determine a peak data transfer rate within the range of the data transfer rates based, at least in part, on the first throughput and the second throughput. In some examples, the higher (i.e. fastest) of the first throughput and the second throughput is chosen as the peak data transfer rate.

Although the flowchart of FIG. 3 shows a specific order of performance of certain functionalities, method 300 is not limited to that order. For example, some of the functionalities shown in succession in the flowchart may be performed in a different order, may be executed concurrently or with partial concurrence, or a combination thereof. In some examples, 360 may be started before 350 is completed. Additionally, while FIG. 3 specifically mentions a specific amount of rates, there may be additional rates that are included in the range. In these examples, step 350 may be performed for each rate and the peak rate determined in 370 is then based on the first throughput, the second throughput, and any additional throughputs.

FIG. 4 illustrates a block diagram of an access point 400. Access point 400 may connect to a wired router and project a wireless signal that is accessible to first computing device 450A, second computing device 450B, and third computing device 450C. Access point 400 is similar to access device 200 except that access point 400 uses WLAN networking protocol. Additionally, access point 400 may transmit and/or receive a wireless signal that uses beamforming to form a MIMO group (e.g., 802.11ac, etc.). Computing devices 450A-450C have beamforming capabilities and thus are in the same MIMO group 451. In some examples, computing device 450A may be a mobile phone, computing device 450B may be a desktop, and computing device 450C may be an electronic reader.

Access devices may have antennas that are omnidirectional, allowing the access device to send energy in all directions. Access devices that are capable of beamforming, like access point 400, may focus energy in specific directions, allowing the focused energy to reach longer distances. Accordingly, as compared to FIG. 2, access device 400 in FIG. 4 may focus the signal in specific directions whereas access device 200 in FIG. 2 may generally send energy in all directions. For example, in FIG. 4, access device 400 may focus energy directly towards first computing device 450A, second computing device 450B, and third computing device 450C, instead of generally all around access point 400.

Access point 400 comprises sounding engine 404, threshold engine 401, error engine 402, and rate engine 403. Error engine 402 implements similar functionalities as error engine 202. Thus, the description for error engine 202 is applicable to error engine 404. Rate engine 403 implements similar functionalities as rate engine 203. Thus, the description for rate engine 203 is applicable to rate engine 403.

Sounding engine 404 is an engine of access point 400 that includes a combination of hardware and software that allows access point 400 to send a sounding packet to computing devices 450A-450C. In some examples, a sounding packet allows access point 400 to receive feedback from the computing devices 450A-450C to determine how to direct the signal (i.e. focus energy) to a specific computing device out of the computing devices 450A-450C.

Sounding engine 404 may send an initial message (e.g., a Null Data Packet announcement frame, etc.) that serves to identify compatible computing devices. Compatible computing devices (e.g., computing devices 450A-450C will receive the message and respond to the message. Sounding engine 404 then sends a packet (e.g., a null data packet, etc.) to each computing device that responded to the initial message. The packet may include orthogonal frequency-division multiplexing (OFDM) training fields. Computing devices 450A-450C may analyze the packet, including the OFDM training fields. Computing devices 450A-450C each sends back a feedback message (e.g., feedback matrix, etc.) to access point 400. Sounding engine 404 receives the feedback messages. Based on the feedback message, the sounding engine 404 may generate a computing device-specific directing data (e.g., a steering matrix, etc.) that details how to direct the energy that is meant to that computing device.

Because focusing energy in one direction may decrease access point 400's ability to focus energy in another direction, the signals to computing devices 450A-450C may interfere with one another. The amount of interference depends on a variety of factors which include the amount of computing devices in the MIMO group, the signal paths, the location of the computing devices, etc. Thus, SNRs that do not take into account the computing devices in the MIMO group may not accurately represent the effect that the computing devices have in the SNR. For example, a computing device in a MIMO may send back an SNR to the access device that includes per-subcarrier delta SNRs along with an average SNR (e.g., in a MU Exclusive Beamforming report). These SNRs do not capture intra-device interference. Similarly, any SNR calculated by the access device from these SNRs also does not capture intra-device interference. SNR values that do not capture intra-device interference may result in a determination of a data transfer rate that is not accurately representative of the wireless environment.

Accordingly, in examples where the access device may beamform signals, like with access point 400, an SNR may be calculated by access point 400 using various factors in the feedback message to capture intra-device interference.

Threshold engine 401 is a combination of hardware and software that allows access point 400 to do so. Threshold engine 401 may be similar to threshold engine 201 except that the indicator received by threshold engine 201 may include the feedback message from the computing devices 450A-450C. The messages may be sent from sounding engine 404 to threshold engine 401. Using at least the fields in the feedback message, threshold engine 401 may calculate an SNR that captures intra-device interference. In some examples, equation (1) as discussed above in relation to instructions 112 may be used to capture the intra-device interference. This equation accurately reflects the number of computing devices in the MIMO group (e.g., computing devices 450A-450C). The SNR that reflects the computing devices 450A-450C may then be used by rate engine 403 to determine a peak data transfer rate that takes into account the intra-device interferences due to the MIMO group comprising computing devices 450A-450C. In some examples, this SNR may be characterized as an SINR.

Access point 400 of FIG. 4, which is described in terms of functional engines containing hardware and software, can include one or more structural or functional aspects of access device 200, or access device 100 of FIG. 1, which is described in terms of processors and machine-readable storage mediums.

Figure 5:
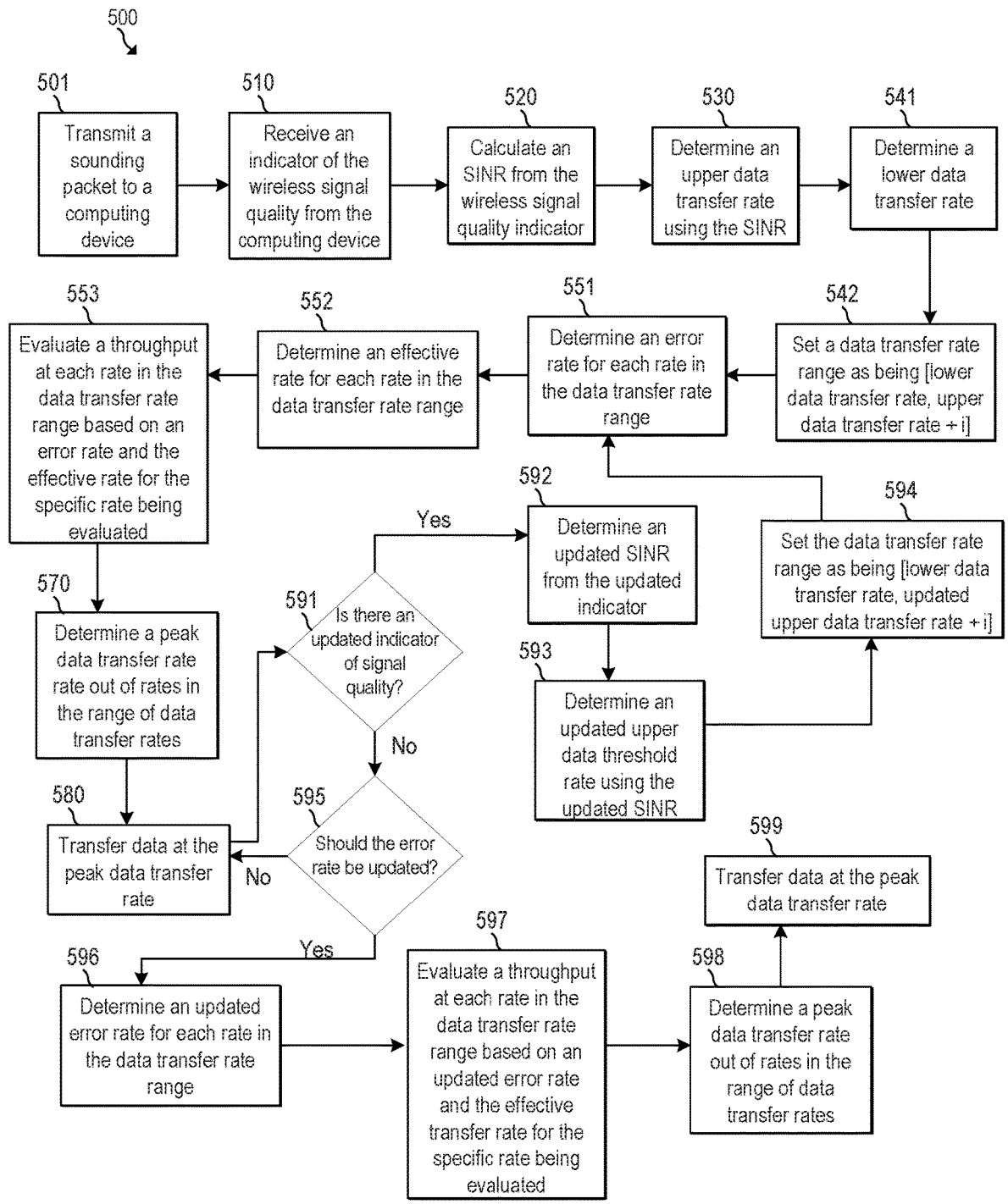
FIG. 5 is a flowchart of a method of determining and updating a peak data transfer rate for a wireless connection, according to some examples.

FIG. 5 illustrates a flowchart for a method 500 to determine a peak data transfer and update the peak data transfer. Although execution of method 500 is described below with reference to access point 400 of FIG. 4, other suitable devices for execution of method 500 can be utilized (e.g., access device 100 of FIG. 1 or access device 200 of FIG. 2.). Additionally, implementation of method 500 is not limited to such examples and can be used for any suitable devices or system described herein or otherwise.

At 501 of method 500, sounding engine 404 of access point 400 transmits a sounding packet to computing device 450A. Computing device 450A is in a MIMO group 451 that also includes second computing device 450B and third computing device 450C. In some examples, the sounding packet may be a Null Data Packet (NDP) with OFDM training fields.

At 510 of method 500, threshold engine 401 may receive an indicator of the wireless signal quality from computing device 450A. As discussed above, the indicator of the wireless signal may include a feedback packet based upon the Null Data Packet.

At 520 of method 500, threshold engine may calculate an SNR from the indicator. In some examples, the SNR may be calculated using equation 1. The SNR may be characterized as an SINR because it captures the intra-device interference that second computing device 450B and third computing device 450C poses to the signal sent to first computing device 450A. Accordingly, the SINR reflects the number of devices in MIMO group 451.

At 530 of method 500, threshold engine 401 determines an upper data transfer rate using the SINR. This may be determined using mappings that correlate SINR to data transfer rates, as discussed above. At 541 of method 500, threshold engine 401 determines a lower data transfer rate. This lower data transfer rate may be equal to the lowest data transfer rate that access point 400 supports and thus may be characterized as the lowest endpoint.

At 542 of method 500, threshold engine 401 sets a data transfer rate range. The lowest endpoint of the range is the lower data transfer rate determined at 541. The highest endpoint of the range may be an arbitrary "speed level" higher than the upper data transfer rate determined at 530. The number of "speed levels" is represented by the character "i" in FIG. 5. Accordingly, the range is set as [lower data transfer rate, upper data transfer rate+i]. In some examples, the number of speed levels may be one speed level. Thus, for example, if the upper data transfer rate is 20 Mbps and the next speed level higher than 20 Mbps is 34 Mbps, the highest endpoint of the range is 34 Mbps. Setting the highest endpoint as being one speed level higher than the upper data transfer rate both allows for a buffer of error in the calculation of the SNR and the efficient use of resources. Evaluating higher speed levels than one level may result in a decreasing rate of return of resources. Thus, the access point 400 does not waste resources evaluating a large number of rates that will not result in a significant increase in the determined peak transfer rate. However, the number of speed levels (i.e. "i") may be any number of speeds, including zero. In example, where i is zero, the highest endpoint of the range is the upper data transfer rate.

At 551, error engine 402 determines an error rate for each data transfer rate in the range. At 552, rate engine 403 determines an effective rate for each rate in the data transfer rate. As discussed above, the effective rate takes into account protocol overheads that may slow down the data transfer rate. At 553 of method 500, rate engine 403 evaluates a throughput at each data transfer rate in the range based on the error rate and the effective rate for the specific data transfer rate that is being evaluated. For example, if the range set in 542 has 20 data transfer rates, error engine 402 determines 20 error rates, rate engine 403 determines 20 effective rates, and rate engine 403 determines 20 throughputs, one for each data transfer rate in the range.

At 570 rate engine 403 determines a peak data transfer rate out of the rates in the range. Rate engine 403 may compare the throughputs evaluated in 553 and choose the highest (i.e. fastest) throughput. At 580, access point 400 may configure its hardware to transfer data at the peak data transfer rate.

At 591 of method 500, threshold engine 401 may determine whether there is an updated indicator of signal quality. Based on the determination that there is not one, method 500 proceeds to 595.

Based on a determination that there is one that it received, method proceeds to 592. At 592, threshold engine 401 determines an updated SINR from the updated indicator. At 593, threshold engine 401 determines an updated upper data threshold rate using the updated SINR. At 594, threshold engine 594 sets the data transfer rate range. The lowest endpoint is set as the lower data transfer rate (as determined at 541). The highest endpoint is set as the updated data transfer rate+i. Method 500 then proceeds through 551-570 to determine an updated peak data transfer rate based on the updated range set in 594.

Referring back to 591, based on the determination that there is not an updated indicator of signal quality, method proceeds to 595. At 595, error engine 402 may determine whether the error rate should be updated. Based on a determination that the error rate should not be updated, method 500 proceeds to 580 where access point 400 may transfer data at the peak data transfer rate. The error rate may be updated due to a change in the environment of the wireless signal, a request from the user of access point 400 to update the error rate, an elapsed time period, etc. For example, error engine 402 may receive a signal (e.g. from access point 400 or from the network) indicating that there is a change in the environment (e.g., that computing device 450A has moved away from access point 400). Error engine 402 may determine that the error rate should be updated and method 500 proceeds to 596. As another example, error engine 402 may receive a command from a user of access point 400 requesting an update in the error rate. Thus, based on a determination that the error rate should be updated, method proceeds to 596.

At 596, error engine 402 determines an updated error rate for each data transfer rate in the range. In some examples, error engine 402 may determine an updated error rate for a specific rate by sending messages at the specific data transfer rate to first computing device 450A. The messages are meant to test the error of the specific rate. First computing device 450A may send a signal indicating how many messages it received from the sent messages. Thus, the signal may indicate that first computing device 450A received 5 packets out of 10 packets that were sent. Error engine 402 may update the error rate for that specific data transfer rate and may track that the error rate is updated in relation to when it was first calculated (e.g., at 551). In some examples, access point 400 may have access to a database that stores historical data relating to an error rate for the specific data transfer rate. In some examples, the historical data is specific to the access point 400 and the first computing device 450A (or a similarly configured computing device). Access point 400 may update the historical database to include the rate determined from the recently transmitted messages at 596.

At 597, rate engine 403 evaluates a throughput at each data transfer rate in the range based on the updated error rate (determined at 596) and the effective data transfer rate (determined at 552) for the specific data transfer rate being evaluated within the range. The range may have been previously determined (e.g., at 542 or 594). At 598, rate engine 403 determines a peak data transfer rate out of the range. At 599, access point 400 transfers data at the peak data transfer rate determined at 598.

Although the flowchart of FIG. 5 shows a specific order of performance of certain functionalities, method 500 is not limited to that order. For example, some of the functionalities shown in succession in the flowchart may be performed in a different order, may be executed concurrently or with partial concurrence, or a combination thereof. In some examples, 580 may proceed to 595 instead of 591 to check the error rate before checking the indicator. Additionally, while FIG. 5 specifically describes method 500 in relation to first computing device 450A, method 500 may also be performed concurrently for second computing device 450B and third computing device 450C.

All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. A non-transitory machine-readable storage medium comprising instructions, that when executed, cause a processing resource to:
   receive an indicator of the quality of a wireless signal between an access device and a computing device;
   determine an upper data transfer rate from the indicator, wherein the upper data transfer rate corresponds to a maximum data transfer rate supported by the access device;
   determine a range of data transfer rate values, wherein the range of data transfer rate values includes a plurality of different data transfer rate values that can be set between the maximum data transfer rate supported by the access device and a minimum data transfer rate supported by the access device and further wherein the range of data transfer rate values includes at least the upper data transfer rate and a second data transfer rate as data transfer rate values;
   evaluate a first throughput at the upper data transfer rate based on an error rate of the access device at the upper data transfer rate;
   evaluate a second throughput at the second data transfer rate based on an error rate of the access device at the second data transfer rate, wherein the second data transfer rate corresponds to a data transfer rate that is lower than the upper data transfer rate; and
   determine a peak data transfer rate within the range of data transfer rate values based on the throughputs.

2. The non-transitory machine-readable storage medium of claim 1, wherein the upper data transfer rate is adjusted from the maximum data transfer rate to a quality data transfer rate determined from a signal to noise ratio based on the indicator.

3. The non-transitory machine-readable storage medium of claim 2, wherein the computing device is in a Multiple-Input and Multiple-Output (MIMO) group comprising a number of computing devices and the signal to noise ratio reflects the number of computing devices in the MIMO group.

4. The non-transitory machine-readable storage medium of claim 1, wherein the indicator comprises a feedback message from the computing device.

5. The non-transitory machine-readable storage medium of claim 1, wherein the error rate of the access device at the upper data transfer rate is a packet error rate (PER).

6. The non-transitory machine-readable storage medium of claim 1, comprising instructions, that when executed, cause the processing resource to:
   receive an updated indicator;
   determine an updated upper data transfer rate;
   determine an updated range of data transfer rate values, wherein the updated range of data transfer rate values includes the updated data transfer rate, the second data transfer rate, and the plurality of different data transfer rate values that can be set between the maximum data transfer rate supported by the access device and the minimum data transfer rate supported by the access device;
   evaluate a third throughput at the updated upper data transfer rate based on an error rate of the access device at the updated upper data transfer rate; and
   determine an updated peak data transfer rate within the updated range of data transfer rate values based on the second throughput and the third throughput.

7. The non-transitory machine-readable storage medium of claim 1, comprising instructions, that when executed, cause the processing resource to:
   evaluate a third throughput at the upper data transfer rate based on an updated error rate of the access device at the upper data transfer rate;
   evaluate a fourth throughput at the second data transfer rate based on an updated error rate of the access device at the second data transfer rate; and
   determine an updated peak data transfer rate within the range of data transfer rate values based on the third throughput and the fourth throughput.

8. The non-transitory machine-readable storage medium of claim 1, wherein the maximum data transfer rate supported by the access device is based on the physical limitations of the access device.

9. The non-transitory machine-readable storage medium of claim 1, wherein each of the plurality of different data transfer rate values included in the range of data transfer rate values correspond to a level within a set of speed levels of a Wi-Fi format.

10. An access device comprising:
a threshold engine to
receive an indicator of the quality of a wireless signal between the access device and a computing device;
determine an upper data transfer rate from the indicator, wherein the upper data transfer rate corresponds to a maximum data transfer rate supported by the access device;
determine a range of data transfer rate values, wherein the range of data transfer rate values includes a plurality of different data transfer rate values that can be set between the maximum data transfer rate supported by the access device and a minimum data transfer rate supported by the access device and further wherein the range of data transfer rate values includes at least the upper data transfer rate and a second data transfer rate as data transfer rate values;
evaluate a first throughput at the upper data transfer rate based on an error rate of the access device at the upper data transfer rate;
evaluate a second throughput at the second data transfer rate based on an error rate of the access device at the second data transfer rate, wherein the second data transfer rate corresponds to a data transfer rate value that is lower than the upper data transfer rate; and
determine a peak data transfer rate within the range of data transfer rate values based on the throughputs.

11. The access device of claim 10, wherein the threshold engine is to determine a signal to noise ratio based on the indicator; and wherein the upper data transfer rate is based on the signal to noise ratio.

12. The access device of claim 11, wherein the computing device is in a Multiple-Input and Multiple-Output (MIMO) group comprising a number of computing devices and the signal to noise ratio reflects the number of computing devices in the MIMO group.

13. The access device of claim 10, comprising a sounding engine to transmit a sounding packet to the computing device.

14. The access device of claim 10, wherein the indicator comprises a feedback message from the computing device.

15. The access device of claim 10, wherein the error engine is to transmit a packet to the computing device at each data transfer rate corresponding to each of the plurality of different data transfer rate values that can be set between the maximum data transfer rate supported by the access device and the minimum data transfer rate supported by the access device in the range of data transfer rate values to determine the error rate for each data transfer rate.

16. The access device of claim 10,
wherein the threshold engine is to
receive an updated indicator of the quality of the wireless signal between the access device and the computing device;
determine an updated upper data transfer rate by adjusting from the maximum data transfer rate to the updated data transfer rate that is determined from a signal to noise ratio based on the updated indicator; and
determine an updated range of data transfer rate values comprising the updated upper data transfer rate and the plurality of different data transfer rate values that can be set between the maximum data transfer rate supported by the access device and the minimum data transfer rate supported by the access device.

17. The access device of claim 16,
wherein the rate engine is:
to evaluate an updated throughput for each data transfer rate corresponding to each of the data transfer rate values within the updated range of data transfer rate values based on the error rate for each data transfer rate within the updated range of data transfer rate values; and
to determine an updated peak data transfer rate based on the throughput of each updated data transfer rate.

18. The access device of claim 10,
wherein the error engine is to determine an updated error rate for each data transfer rate within the range of data transfer rate values; and
wherein the rate engine is to evaluate an updated throughput for each rate within the range of data transfer rate values based on the updated error rate for each rate within the range of data transfer rate values.

19. A method comprising:
receiving, by a processing resource of an access device, an indicator of the quality of a wireless signal between the access device and a computing device;
determining, by the processing resource, a signal to noise ratio based on the indicator;
determine an upper data transfer rate from the indicator based on the signal to noise ratio;
determining, by the processing resource, a range of data transfer rate values, wherein the range of data transfer rate values includes a plurality of different data transfer rate values that can be set between the upper data transfer rate and a second data transfer rate;
evaluating, by the processing resource, a first throughput at the upper data transfer rate based on an error rate of the access device at the upper data transfer rate;
evaluating, by the processing resource, a second throughput at the second data transfer rate based on an error rate of the access device at the second data transfer rate; and
determining, by the processing resource, a peak data transfer rate within the range of data transfer rate values based on the throughputs.

20. The method of claim 19, wherein the computing device is in a Multiple-Input and Multiple-Output (MIMO) group comprising a number of computing devices and the signal to noise ratio reflects an interference of the number of computing devices on the wireless signal.

21. The method of claim 19, comprising:
receiving, by the processing resource, an updated indicator of the quality of the wireless signal;
updating, by the processing resource, the range of data transfer rate values based on the updated indicator; and
determining, by the processing resource, an updated peak transfer rate within the updated range of data transfer rate values.

22. The method of claim 19, comprising:
determining, by the processing resource, an updated error rate of the access device at the upper data transfer rate;
determining, by the processing resource, an error rate of the access device at the second data transfer rate;
evaluating, by the processing resource, an updated throughput at the upper data transfer rate based on the updated error rate of the access device at the upper data transfer rate;

evaluating, by the processing resource, an updated throughput at the second data transfer rate based on the updated error rate of the access device at the second data transfer rate; and determining, by the processing resource, a peak transfer rate within the range of data transfer rate values based on the updated throughputs.

\* \* \* \* \*